(12) United States Patent
Gartland et al.

(10) Patent No.: US 6,554,930 B1
(45) Date of Patent: Apr. 29, 2003

(54) METHOD AND APPARATUS FOR CONNECTING CORDS/FILAMENTS

(75) Inventors: Robert John Gartland, Youngstown, OH (US); Kenneth Michael Kot, Canton, OH (US); Jimmy Lee Richards, Cuyahoga Falls, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/856,078

(22) PCT Filed: Dec. 22, 1998

(86) PCT No.: PCT/US98/27413

§ 371 (c)(1),
(2), (4) Date: May 16, 2001

(51) Int. Cl.[7] .............................................. B32B 31/16
(52) U.S. Cl. .................... 156/73.2; 156/73.1; 156/158; 156/433; 156/580.1; 156/580.2
(58) Field of Search .............................. 156/73.1, 73.2, 156/73.4, 153, 158, 433, 502, 580.1, 580.2

(56) References Cited

U.S. PATENT DOCUMENTS

| | | | | |
|---|---|---|---|---|
| 3,184,363 A | | 5/1965 | Strother ...................... 156/433 |
| 3,616,064 A | * | 10/1971 | Long et al. .............. 156/379.6 |
| 3,657,056 A | * | 4/1972 | Winston et al. .......... 156/580.2 |
| 4,106,973 A | * | 8/1978 | Wright ........................ 156/433 |
| 5,173,136 A | * | 12/1992 | Agarwal et al. ........ 152/209 R |
| 5,598,694 A | * | 2/1997 | Wright .......................... 57/293 |
| 5,743,975 A | | 4/1998 | Sinopoli et al. ............ 152/527 |

FOREIGN PATENT DOCUMENTS

| | | | |
|---|---|---|---|
| EP | 0226464 | 6/1987 | ............. D03J/1/16 |
| GB | 1154429 | 6/1969 | ........... B65H/69/00 |
| NL | 6604230 | 10/1967 | |
| WO | 9110003 | 7/1991 | ............. D03J/1/14 |

* cited by examiner

*Primary Examiner*—James Sells
(74) *Attorney, Agent, or Firm*—David E. Wheeler

(57) ABSTRACT

An apparatus for welding monofilaments at a loom makes possible a method for a continuous process for weaving monofilaments into fabric. The apparatus comprises a stand (15) on which is mounted welding apparatus (16) and a filament alignment block (20). In the method, a monofilament (30a) in the loom is welded to the leading end of a monofilament (30) on a new spool of monofilament. By welding new monofilament to monofilament in the loom, restringing of the loom is avoided.

3 Claims, 8 Drawing Sheets

FIG 3B
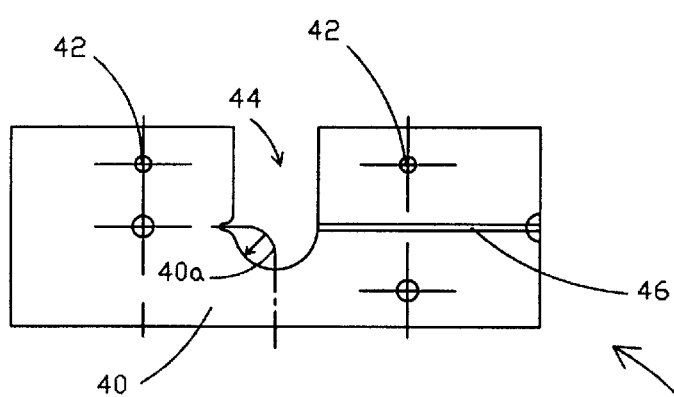
FIG. 3C
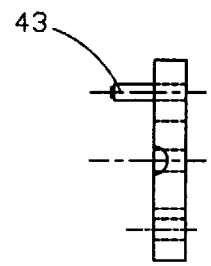
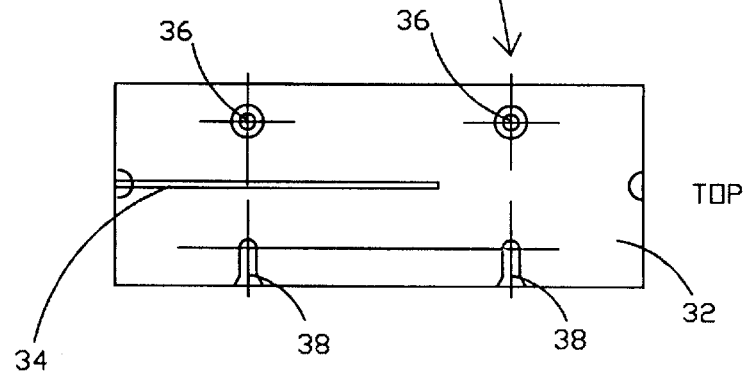
FIG. 3A

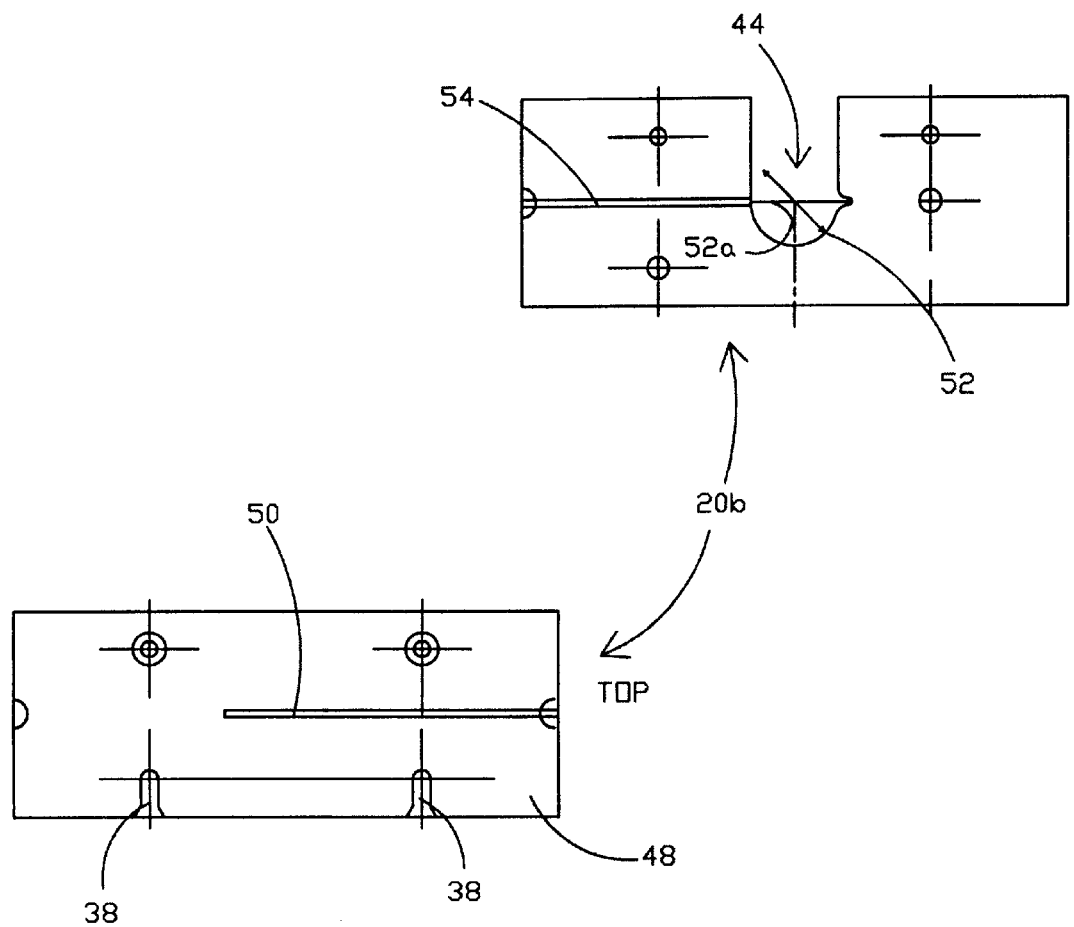

METHOD AND APPARATUS FOR CONNECTING CORDS/FILAMENTS

TECHNICAL FIELD

The invention relates to a method for, and apparatus used to weld thermoplastic materials in a continuous industrial process.

BACKGROUND ART

Looms used in fabric weaving processes are complex and have a number of creels, spools, spindles, reeds, drop wire slots, and tensioning festoons over which each individual filament or cord needs to be strung. This is a time consuming process for one cord, and since a typical bolt of fabric may have 600 to 2000 cords, more or less, stringing a loom for initial operation is a time consuming and difficult process.

Since filaments or cords are ordinarily supplied on a spool or a package which contains a limited supply of cord or filament, if some means were not provided to keep the loom strung, this process would have to be repeated each time a spool of filament or cord was depleted during weaving. Fortunately, in industrial looms, some efficiency is recaptured by tying a new spool of cord or filament to the end of a depleted spool of filament or cord before the depleted end of the cord or filament passes through the loom.

In recent years, monofilament materials, such as those described in U.S. Pat. No. 5,173,136 to Agarwal et al., and U.S. Pat. No. 5,743,975 to Sinopoli et al., have been gaining acceptance as a reinforcement material in composites. It has been found, however, that conventional cord tying or splicing does not work for monofilaments since monofilaments tend to be stiff and slippery. Knots are too bulky, snag on the equipment, and tend to slip. Also, monofilaments tend to slip out of conventional wrap splices.

In the weaving of monofilaments, especially heavy gauge nylon monofilaments, it is important to be able to attach one end of a filament to the end of another filament to 1) tie in successive creels or 2) repair a broken filament broken during weaving.

When it was found that conventional tying and splicing did not work for monofilaments, the inventors tested and collected data on a number of methods which might be used in place of tying or splicing and eventually decided to try to melt or fuse the individual monofilaments to each other at the loom. Once it was determined that specific monofilament materials can be fused by welding, the object of the invention was to develop a method and apparatus to provide an economical process for attaching the cords.

Although it is believed that other welding techniques will work, it was decided to use ultrasonic welding in the method.

Ultrasonic welding comprises the generation of high frequency (20 kHz or 40 kHz) mechanical vibrations which are transmitted to a welding horn. An ultrasonic welding horn applies a force at the surface of the materials to be bonded, and uses intermolecular friction at the interface to melt the material. A force is maintained against the material by the welding horn after the vibration is stopped, and upon cooling, a weld is produced.

Strother, in U.S. Pat. No. 3,184,363 describes an apparatus for splicing thermoplastic cords which comprise an apparatus having a die comprising a slot for holding thermoplastic material, wherein the bottom of the slot is concave and substantially semi-cylindrical. A tool in the apparatus is adapted to enter the slot and is concave and generally complimentary to the slot bottom. The apparatus has means for urging a tool into the die slot, and means for vibrating the tool at high frequency. The heat generated by the vibrations causes a thermoplastic material contained in the slot to melt.

Long et al. in GB 1,154,429 teach a process and apparatus for joining the ends of two textile threadlines. The apparatus comprises an ultrasonic apparatus is mounted on a casing 4 which surrounds a transducer stack. A straight groove 5 is cut across the face of a coupling stub 3 to locate and support threadlines being joined. A plunger 11 is mounted on a cam 7 for movement in and out of the stub groove 5. The cam 7 rotates on a pivot 17 at one end of an arm 9 which pivots on an axis on a support member 10. The plunger is slidably mounted in an arm 12 and bears against the surface of the cam through the action of a compression spring 13. The compression spring is opposed by a tensioning spring 14 attached to pivot 17. The pressure exerted by the plunger is determined by the tensioning of the springs.

Other objects of the invention will be apparent from the following description and claims.

DISCLOSURE OF INVENTION

A method for continuous operation of a fabric-weaving unit for weaving a fabric made from thermoplastic cords or monoflaments comprises the steps of (a) feeding a leading end of a first thermoplastic cord or monofilament (30*a*) into a weaving appartus through various reeds, drop wire slots, rolls and guides of the weaving apparatus and weaving the cord or monofilament (30*a*) into a fabric, (b) continuing processing of the cord or monofilament (30*a*) to a trailing end of the cord or monofilament (30*a*), (c) welding the trailing end of the cord or monofilament (30*a*) to a leading end of a second thermoplastic cord or monofilament (30), and (d) continuing the operation of the weaving unit by weaving the second thermoplastic cord or monofilament (30) into a fabric.

The method is illustrated using 2,000 to 20,000 dTex thermoplastic monofilaments as fabric material.

In a preferred embodiment, the method is used with cords or monofilaments comprising nylon.

The method is illustrated making a roll of fabric using 8 to 40 ends per inch (epi) cords or monofilaments in the warp direction and 1 to 8 epi pick cords in the weft direction, using an ultrasonic welder.

The method is carried out so that the monofilaments or cords (30,30*a*) are oriented such that at least one end thereof is fused in a weld (60), and preferably the weld (60) is oriented such that the lead end of the weld is fused so that a loose end (58) does not snag on any parts of the processing equipment.

Also provided is an apparatus for splicing thermoplastic cords or monofilaments comprising a welder (16) mounted on a fixture (14), said fixture (14) being rotatably mounted to a pole (12), said pole (12) being attached to a stand (15). The stand (15) is lightweight and can easily be moved, and may be otherwise adapted to be mobile, or in an alternative embodiment, may be fixed in position. In the illustrated embodiment, pole (12) is mounted vertically and the fixture (14) is adapted to rotate around the pole (12).

In the illustrated embodiment, the welder (16) is an ultrasonic welder. The welder (16) has a welding horn (18) which is used in conjunction with an anvil (20) for welding material. The anvil (20) may comprise a right feed cord alignment block (20*a*) or a left feed cord alignment block (20*b*).

Also provided is a mold for welding cord or filament ends comprising a top plate (32,48) and a lower plate (40,52), the top plate (32,48) being adapted to be pressed together the lower plate (40,52), wherein the top plate (32,48) has a groove (34,50) which transverses more than ½ the length of the top plate (32,48), and the lowerplate (40,52) has a groove (46,54) which traverses less than ½ the length of the lower plate (40,52) and an opening (44) at the termination of the groove (46,54). When the top plate (32,48) is aligned with and pressed together with the lower plate (40,52) to form a block (20) the groove (34,50) in the top plate (32,48) is in an opposite end of block (20) from the groove (46,54) in the lower plate (40,52), and the lower plate groove (34,50) overlaps with top plate groove (46,54) in the middle of block (20). An opening (44) in lower plate (40,52) is adapted to receive a welding horn (18).

BRIEF DESCRIPTION OF DRAWINGS

FIG. 3a illustrates a top plate of a cord alignment block (right feed).

FIG. 3b illustrates a side view of the plate of FIG. 3a.

FIG. 3c illustrates a bottom plate of a cord alignment block (right feed).

FIG. 4a illustrates a top plate of a cord alignment block (left feed).

FIG. 4b illustrates a bottom plate of a cord alignment block (left feed).

DETAILED DESCRIPTION OF THE INVENTION

Traditionally, nylon and polyester twisted cords are tied to splice in new spools or to make a repair when the cord breaks.

Tied knots were used in an attempt to fasten one end of a nylon monofilament (10,000 dtex) to another. However, such knots tend to be very bulky and difficult to pass through the small openings of the weaving loom reeds and drop wires, and tend to slip apart when a tension is applied. A nylon monofilament is a smooth, slippery and solid cord. It is relatively inextensible, since there is little or no twist in the monofilament.

An automatic mill knot device (air entanglement) could not be used due to the absence of numerous fine filaments which make possible the entanglement. A trial using an epoxy adhesive did not provide sufficient bond strength and flexibility to be pulled through the weaving loom.

Another type of splice is made by tightly wrapping a fine yarn around overlapped ends of the cord or monofilament. However, wrapping the monofilament increased the overall diameter at the splice, making it difficult to pull the splice through the reeds and drop wires, and some of the splices would pull apart due to the slippery surface of the monofilament. Also, the cord ends would sometimes catch and snag on the reeds or drop wires.

Wrap splicing the individual monofilament ends at the creel was time consuming and labor intensive. Even if a wrap splice would have been sufficient to tie in a new creel, a wrap splice is unacceptable to make a repair if a monofilament breaks and has to be tied together to continue weaving. Also a monofilament wrap splice pulls loose as the woven monofilament is processed in fabric treatment equipment.

Nylon is a thermoplastic material, and is representative of all thermoplastic materials that can be used in the invention.

Thermoplastic materials, while solid at moderate temperatures, soften or melt and flow at higher temperatures without permanently altering their chemical composition, and accordingly return to their original state when they return to a moderate temperature. Because of this property, thermoplastic materials can easily be joined at temperatures above the melting point of the materials by low temperature welding, especially ultrasonic welding.

The present invention can be used with any type of welding equipment suitable for the materials being joined, such as heated presses, but is described herein specifically using an ultrasonic welder for joining thermoplastic materials.

Figures 1, 1A:
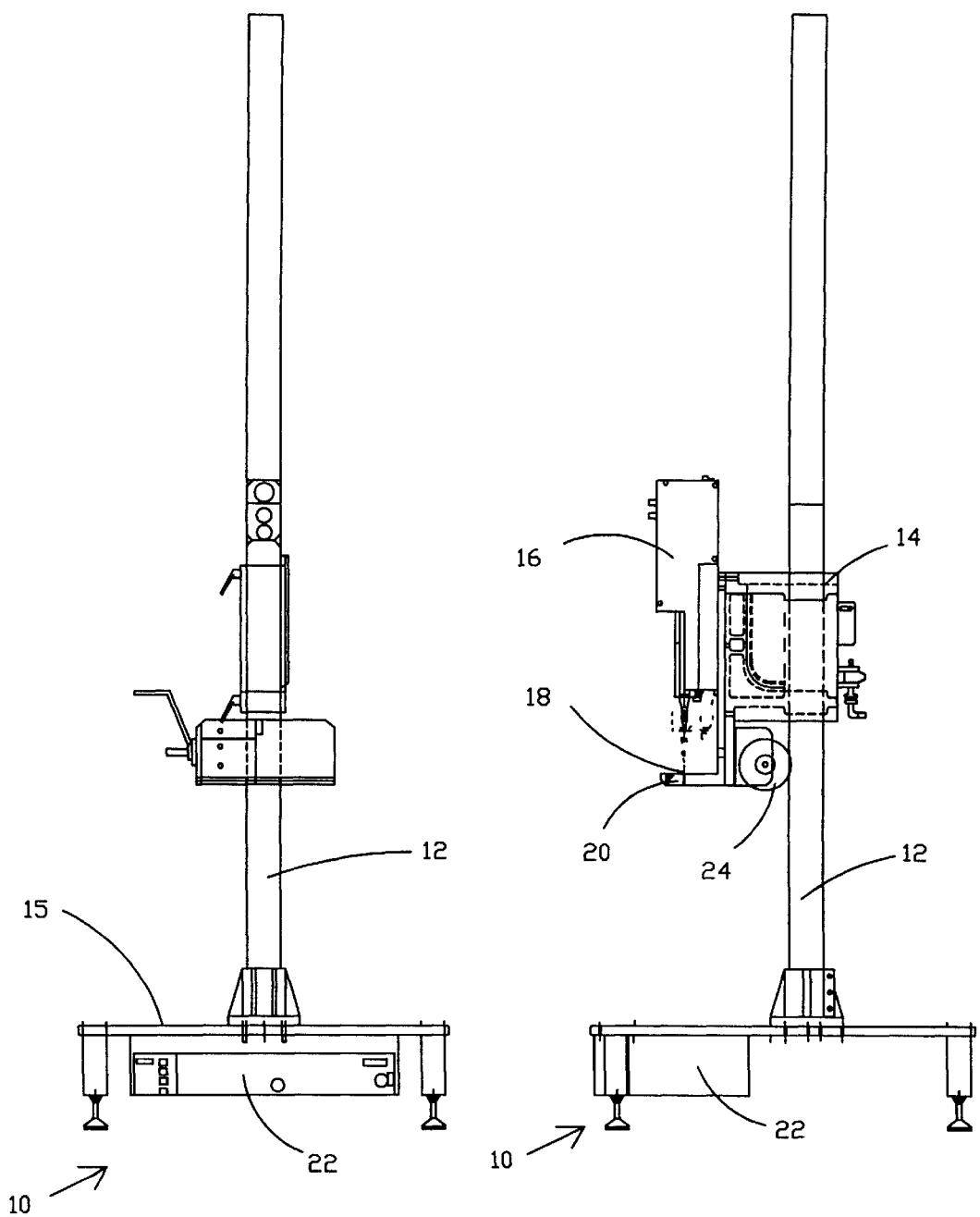
FIG. 1 illustrates a front view of an apparatus of the invention.
FIG. 1a illustrates a side view of an apparatus of the invention.

With reference now to FIGS. 1 and 1a, in the illustrated embodiment of apparatus that may be used in the method of the invention, the apparatus 10 comprises a pole 12 attached to a stand 15, and a welding unit 16 is attached to pole 12 through mounting fixture 14. A power source 22, which may include an electronic interface, may be carried in stand 15.

The apparatus is lightweight and may be easily moved from position to position as needed, so apparatus 10 can be moved to a welding job at a particular loom. In the illustrated embodiment, stand 15 is fixed at the loom on which it is used.

Mounting fixture 14 may be slid up and down pole 12 for welding at different heights, and may be rotated 360° on pole 12 for welding at different angular positions relative to stand 15. Wheel 24 is attached to a counterweight system which helps control movement of welder 16 as mounting fixture 14 is slid up and down pole 12.

In the illustrated embodiment, welder 16 is an ultrasonic welder having a welding horn 18, and a cord alignment block 20 which is used as an anvil for welding.

Figure 5:
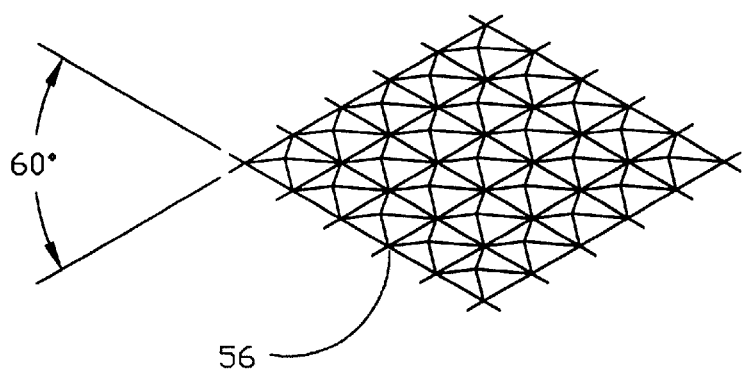
FIGS. 5 and 5a illustrate a knurled welding head used in the method of the invention.
Figure 5A:
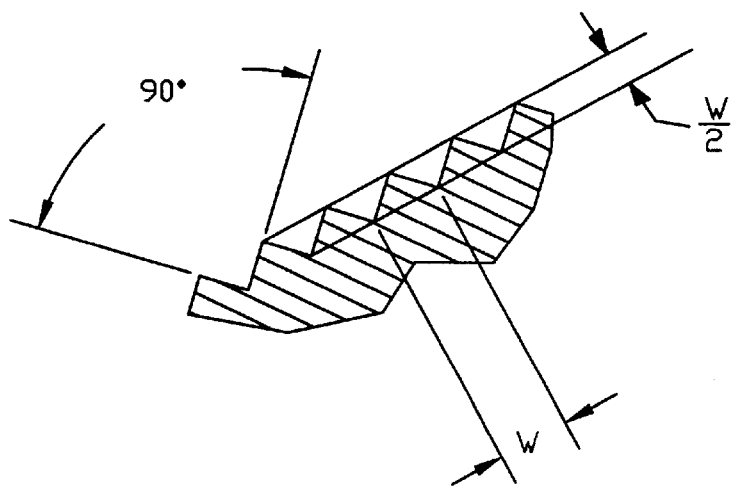

By experimenting with a large number of different types of welding horns, it was discovered that for the purposes illustrated herein, a knurled welding horn 18 (FIG. 5) produced the best results. Those skilled in the art will recognize that other welding horns may give better results when used under different conditions.

Figure 2:
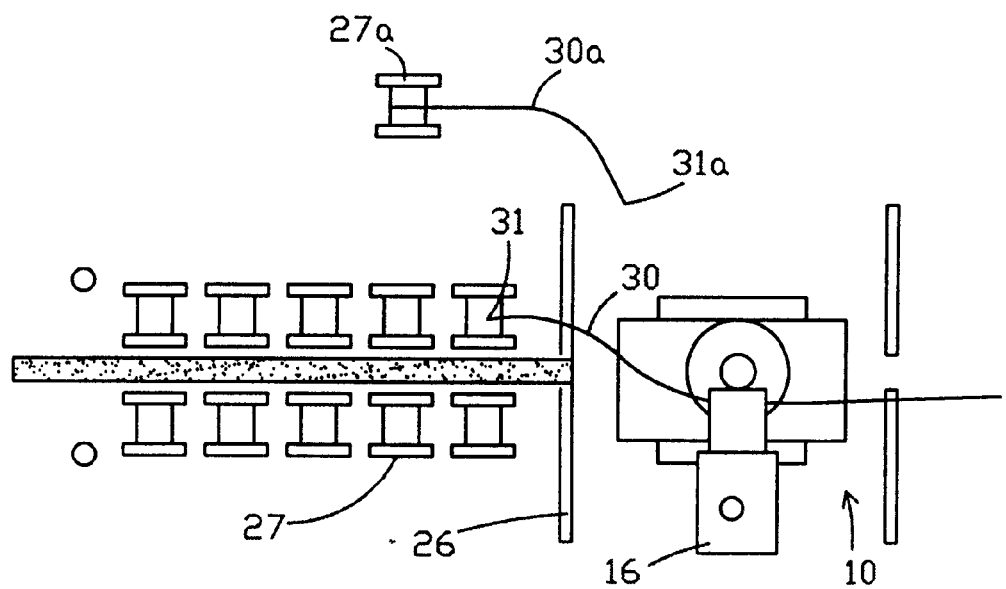
FIG. 2 illustrates a view of an apparatus of the invention in proximity to the creel of a loom.
Figure 2A:
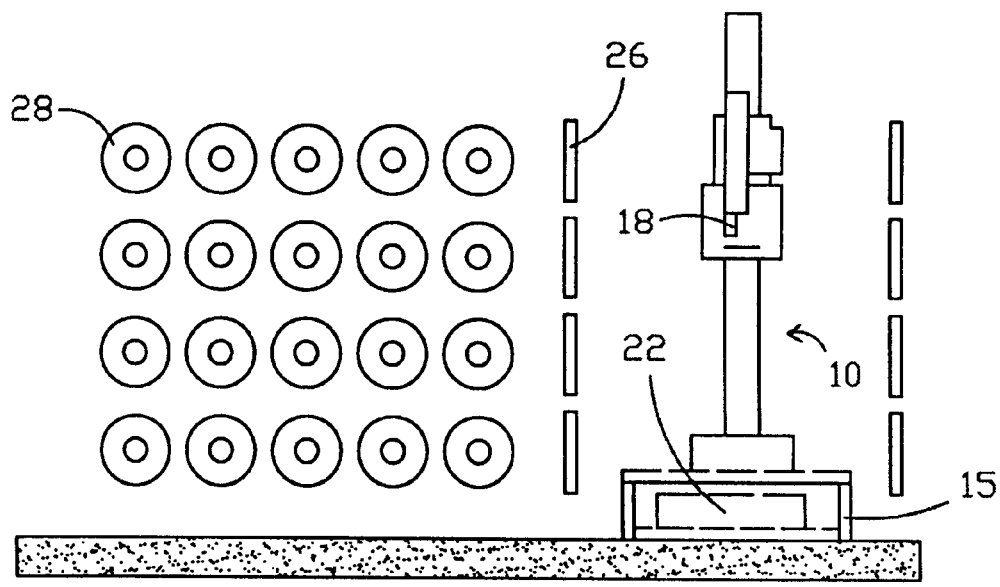
FIG. 2a illustrates a side view of an apparatus of the invention in proximity to the creel of a loom.

With reference now to FIGS. 2 and 2a, apparatus 10 may be moved next to creel 26 when a spool 27 of monofilament 30 is about to be depleted and it is time to attached a new spool 27a of monofilament 30a to the end of monofilament 30 before it passes through the loom (not shown). The operator will catch end 31 of cord or filament 30 and direct it to welding apparatus 10, and at the same time pull end 31a of cord or filament 30a to apparatus 10 to weld them together. The new spool 27a is then placed on the creel to replace old spool 27.

Those skilled in the art will recognize that the creel and or loom may be equipped with sensors to indicate when the end of a filament or cord 30 is detected.

Also, it is possible to replace one creel with another, so that all the connections will be made when a new creel is moved into position at the loom.

Since a loom is relatively wide, apparatus 10 can be moved dependent on the location of a spool 27 on the creel and its relationship to the loom. Also, to save space on the creel, spools 27 are stacked, and mounting fixture 14 can be raised or lowered on pole 12 to place welder 16 in proximity to the height of a spool 27. Mounting fixture 14, as noted above, can also be rotated on pole 12 if needed.

With reference now to FIGS. 3 and 4, a cord alignment block 20 comprises, in the illustrated embodiment, a lower plate 32,48 and a top plate 40,52.

The cord alignment block 20a illustrated in FIGS. 3a, 3b and 3c is a right feed block.

Figure 8:
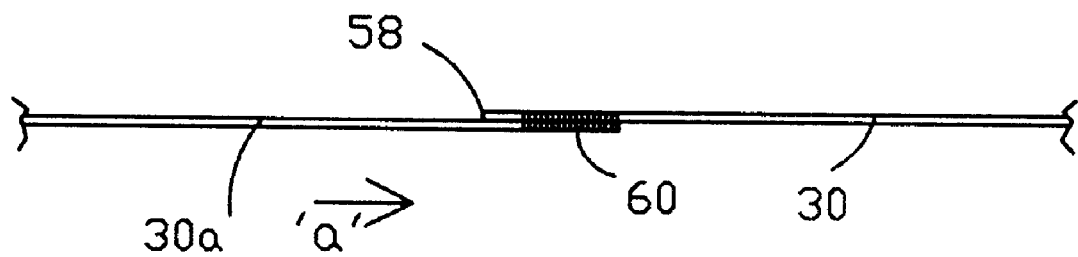
FIG. 8 illustrates a weld made according to the method of the invention.

When apparatus 10 is placed by creel 26, and the mounting fixture 14 is pivoted on pole 12, monofilaments to be welded may pass on the right or the left side of pole 12. Because monofilaments 30 and 30a are overlapping when a weld is made, and it is difficult make the overlap equal to the width of the weld, there may be a loose end of monofilament at the weld. See FIG. 8. Since a loose end will likely snag in the loom train at a number of locations, it is important that a loose end be the trailing end of the weld as the monofilament passes through the loom, so that such snagging can be prevented. By providing a right feed cord alignment block 20a (FIGS. 3a, 3b, 3c) and a left feed alignment block 20b (FIGS. 4a, 4b), the overlapping of the welded monofilament ends can be controlled so that any loose filament ends trail the weld as the monofilament passes through the loom. When welder 16 is on the left side of pole 12, left feed alignment block 20b is used to make sure free end 58 of monofilament 30 trails weld 60 through the loom. And likewise, when the welder 16 is on the right side of pole 12, right feed alignment block 20a is used to make sure the end of monofilament 30 is fused with weld 60 and the free end 58 is oriented so that it does not snag the equipment.

To help make certain that at least one of the two welded ends of monofilament are integral with the weld, using the right feed monofilament alignment block 20a of FIG. 3 as an example, lower plate 32 has a slot 34 for holding a monofilament 30 in the lower plate of the monofilament alignment block 20. Similarly, top plate 40 has a slot 46 for holding a monofilament 30a in top plate 40. When top plate 40 and lower plate 32 are pressed together and aligned, using alignment posts 43 and alignment slots 38, monofilaments 30,30a can be pushed into alignment block 20a through slots 34 and 46 so that they overlap in the opening 44 of alignment block 20a. Opening 44 is adapted to receive a welding horn 18 when the welding operation is carried out. The end of the monofilament in slot 46 will be above the end of the monofilament in slot 34 in opening 44 when a weld is made. Since, as illustrated, slot 34 is long enough to extend through opening 44, but the filament in slot 46 is stopped within opening 44 by top plate 40 at edge 40a, the operator can visually make sure that the end of the monofilament in slot 46 is under weld horn 18 when a weld is made.

Holes 36 are used to mount block 20 into the ultrasonic welding base.

With reference to FIG. 4, a similar but oppositely oriented (as compared to FIG. 3) slot 50 is in lower plate 48, and an oppositely oriented slot 54 is in top plate 52 in a left feed monofilament alignment block 20b. Except for the orientation, left feed alignment block 20b is used in the same manner as described for alignment block 20a.

In the illustrated embodiment, the monofilament alignment blocks 20a, 20b have hinges 38 for convenience of handling. Those skilled in the art will recognize that the lower plates 32, 48 will have to be separated from top plates 40, 52 after a weld has been made, to remove welded monofilaments 30, 30a from the monofilament alignment block 20.

Figure 6:
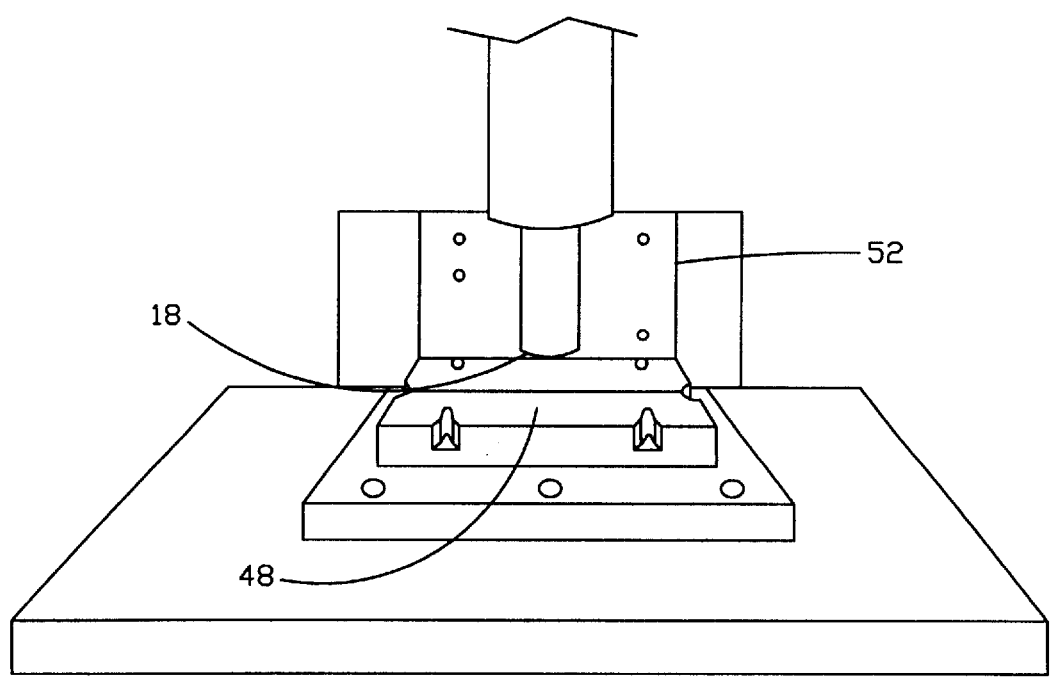
FIG. 6 is a perspective view of a welding head in proximity to an alignment block.
Figure 7:
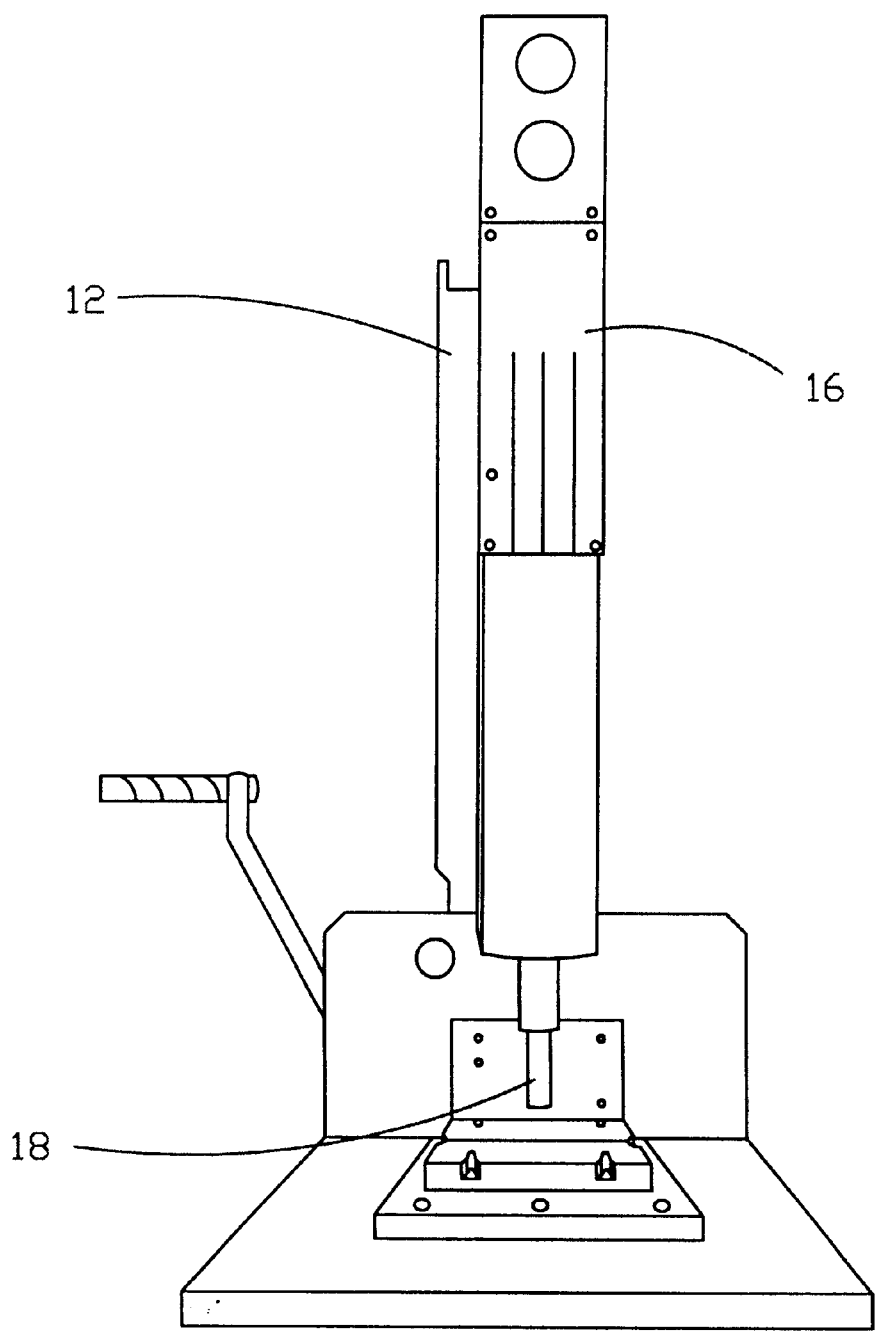
FIG. 7 illustrates a perspective view of an alignment block and an ultrasonic welder mounted on a pole.

FIGS. 6 and 7 illustrate two different enlargements of portions of the apparatus of the invention.

With reference to the figures, in the method of the invention, a stand 15 is placed in the proximity of a loom near the creel stand 26. On the right side of creel stand 26, a right feed alignment block 20a is used with apparatus 10 as monofilament 30a is welded to the end of a depleted roll of monofilament 30 in creel 26. Filament 30 is pushed into slot 34 in top plate 32 and filament 30a is pushed into slot 46 in lower plate 40 and weld horn 18 is moved into opening 44 in lower plate 40. A weld 60 is made making sure that the end of filament 30a is incorporated in the weld. If a free end 58 of filament 30 escapes the weld 60, this will not hinder the processing of filament 30a through the loom because filament 30a passes through the loom in the direction of arrow 'a', and end 58 trails weld 60 through the loom and cannot catch or snag on the various parts of the loom.

In a similar manner, when stand 15 is placed on the left side of creel 26a, left feed monofilament alignment plate 20b will be used to prevent a free end 58 from snagging in the loom.

These splices can be pulled through the weaving loom at required tensions, and easily pass through the reeds and drop wire slots on the weaving loom without failing.

Although the invention was originally developed to address the problems encountered in weaving monofilament fabric, those skilled in the art will recognize that the invention can be used with cords made of thermoplastic materials.

The invention is further illustrated with reference to the following example.

EXAMPLE

Feasibility studies were conducted using hand operated prototype equipment for ultrasonic splicing of individual cord ends. For these early development trials at the fabric mill, the ultrasonic welder was rented from Branson Ultrasonic Incorporation. The 150 watt unit, Model E150, Power Supply TW-1 Converter used a ½-inch diameter knurl tip horn with the alignment fixture.

Dukane Corporation manufactured two ultrasonic welding units to Goodyear specifications that were used to connect nylon monofilaments to each other. The welding units are Dukane 410 7OOAT 40 kHz thrusters with a horn that has a ½ inch diameter knurled tip. Each assembly consists of a stand, pole, and the ultrasonic press on a platform which can move vertically and rotate around the pole. Each unit is installed at the end of a creel row in the center of the two-sided creel, and just before the first set of drop wires. Welding in a new creel will consists of starting at the bottom of one side of a row and working up to the top, rotating the welding press fixture 180 degrees at the top, lowering the fixture to the bottom, and continuing welding of the other side starting from the bottom and progressing toward the top. The fixture is stored at the top of the pole until a new creel is needed.

Welding conditions for the monofilament are: weld time 1.5 sec, hold time 1.0 sec, and weld pressure of 30 psi, and holds pressure of 40 psi. Typical weld strength observed was 25–30 pounds force.

Two mold fixtures are used to position the monofilaments prior to the actual welding with the ½-inch diameter horn.

One fixture is for the left side of the creel stand and the other is for the right side of the creel stand. Alignment of the nylon monofilaments is important such that there are no leading weld tabs, e.g. monofilament ends that might catch or snag on sharp edges as the welds are pulled through the weaving unit. This is accomplished by pulling the bottom monofilament back ¼ inch (in the mold fixture) just before welding. The alignment mold is split at the plane of the monofilament such that after the two ends are attached, the mold is opened and the filament can be released.

By experimentation it was determined that the following weld parameters and specifications give good results under the conditions described herein.

TABLE I

Dukan 410 700AT 40 kHz, Recommended Settings for Individual Monofilament Splices, 10,000 dtex Round Nylon Monofilament

| Power Supply Unit | |
|---|---|
| Weld Time, sec | 1.5 |
| Hold Time, sec | 1.0 |
| Power Setting | 15 |
| Switch Setting | Operate |
| L1 Function | 0 (disabled) |
| Welding Press Stand | |
| P1-Weld Pressure, psi | 30 |
| P2-Hold Pressure, psi | 40 |
| Down Speed Control | 3 turns CC |
| Pre-Trigger Adj | 10 (bottom) |
| End Weld Adj | 10 (bottom) |
| Mechanical Stop | 15 mils above mold |
| Trigger control | 0.1 turns > Minimum setting |

Table II illustrates weld strength for a sample weld.

TABLE II

Ultrasonic Welded Splices
Welding Conditions Established Above

| Welder | Left | Right |
|---|---|---|
| Tensile St, N | 28.2 | 30.2 |
| Std Div, N | 3.0 | 2.9 |
| Failure Type | * | * |

* Mixture of weld failures (bond failure at interface) weld breaks (top monofilament breaks at interface)

Table III illustrates the steps used to form a weld.

TABLE III

PROCEDURE FOR WELDING ONE MONOFILAMENT TO ANOTHER

1. Fix setting on the unit for output at 1.5 weld time at 1.5 seconds, hold time at 1.0 second, and switch setting to OPERATE.
2. Use proper Alignment mold that matches the side of Creel working on: L - left side of creel row, R - right side of creel row.

TABLE III-continued

PROCEDURE FOR WELDING ONE MONOFILAMENT TO ANOTHER

3. Turn on air pressure to the welding press, setting for weld psi at 30 and hold psi at 40.
4. Place monofilament in side 1 (CREEL) on the filament alignment block and insert to the stop point.
5. Place monofilament in side 2 (LOOM) on the filament alignment block and insert to the stop point.
6. Pull back on the monofilament on side 1 about ¼ inch so that the end of the monofilament is aligned with a mark on the filament alignment block.
7. Weld the monofilament together by pushing down on the two start buttons simultaneously. The rest of the cycle is completed automatically.
8. Weld the creel row from the bottom to the top. Rotate the welder at the top 180 degees to start the other side of the row. Lower the unit and start from the bottom.

What is claimed is:

1. A method for continuous operation of a fabric-weaving unit for weaving a fabric made from thermoplastic monofilaments comprising the steps of (a) feeding a leading end of a first thermoplastic monofilament (30a) into a weaving apparatus through various reeds, drop wire slots, rolls and guides of said weaving apparatus and weaving said monofilament (30a) into a fabric, (b) continuing processing of said monofilament (30a) to a trailing end of said cord or monofilament (30a), characterized by (c) ultrasonically welding said trailing end of said monofilament (30a) to a leading end of a second thermoplastic monofilament (30)

(d) orienting monofilaments or cords (30,30a) such that at least one end thereof is fused in a weld (60), and (e) orienting a weld (60) on said monofilaments or cords (30,30a) such that a weld (60) leads any loose ends (58) through processing equipment, (f) continuing the operation of said weaving unit by weaving said second thermoplastic cord or monofilament (30) into a fabric.

2. An apparatus for splicing thermoplastic cords or monofilaments comprising an ultrasonic welder (16) mounted on a fixture (14), said fixture (14) being rotatably mounted to a pole (12), said pole (12) being attached to a stand (15) wherein said stand (15) is adapted to be mobile around a creel row (26).

3. The apparatus of claim 2 wherein the welder (16) has a welding horn (18) which is used in conjunction with an anvil (20) for welding material wherein the anvil (20) may comprise a right feed cord alignment block (20a) or a left feed cord alignment block (20b).

* * * * *